United States Patent [19]

Reichert et al.

[11] 4,386,059
[45] May 31, 1983

[54] ZINC HYDROXY PHOSPHITE COMPLEX

[75] Inventors: William W. Reichert, Trenton; Charles A. Cody, East Windsor; Carle H. Youngken, Hightstown, all of N.J.

[73] Assignee: NL Industries, Inc., New York, N.Y.

[21] Appl. No.: 376,094

[22] Filed: May 7, 1982

[51] Int. Cl.³ .................. C01B 15/16; C01B 25/26
[52] U.S. Cl. .................. 423/307; 106/292; 423/305
[58] Field of Search ............ 423/305, 307; 106/292

[56] References Cited

U.S. PATENT DOCUMENTS 2,483,469  3/1949  Kebrich .................. 423/307
3,917,804  11/1975 White et al. .............. 423/305
4,207,301  6/1980  Danjushevskaya et al. .... 423/309
4,294,808  10/1981 Wasel-Nielen et al. ...... 106/292

FOREIGN PATENT DOCUMENTS 1112054  8/1961  Fed. Rep. of Germany ...... 423/305
2006632  3/1971  Fed. Rep. of Germany ...... 423/305
  20392  of 1890 United Kingdom ............ 423/305
 234138  12/1925 United Kingdom ............ 423/305

Primary Examiner—O. R. Vertiz
Assistant Examiner—Wayne A. Langel

[57] ABSTRACT

A substantially pure composition of matter and process for making the same which comprises a zinc hydroxy phosphite complex represented by the theoretical structural formula $[2Zn(OH)_2 \cdot ZnHPO_3] \cdot XZnO$ wherein X is a number from 0 to 17 and wherein the structure has infrared absorption frequencies at 3506; 3472; 3282; 3163; 2401; 2361; 1079; 947; 867; and 796 cm$^{-1}$, ±4.0 cm$^{-1}$, and X-ray diffraction d(A) spacings at 9.04; 5.94; 4.44; 3.58; 3.44; 3.38; 2.75; 2.70; and 1.67; ±0.02A.

14 Claims, 4 Drawing Figures

ZINC HYDROXY PHOSPHITE COMPLEX

This invention relates to the formation of a novel chemical complex, particularly a zinc hydroxy phosphite complex and process for preparing the same. The zinc hydroxy phosphite complex of this invention is employed as an effective corrosion-resistant pigment incorporated into water and solvent based coating compositions for protection of metals.

The use and formation of zinc and lead containing phosphate and phosphite compositions is well known in the art. U.S. Pat. No. 4,207,301 discloses a known process for preparing zinc phosphate by reacting zinc sulphate with a solution of phosphoric acid in the presence of an alkali. This patent also discloses a process for producing zinc phosphate by treating zinc oxide with a solution of phosphoric acid at the boiling point of the solution followed by cooling the solution and separation of a crystalline product. The use of metallic zinc and optional oxidizing agent are specifically claimed as ingredients that aid in the yield of the zinc phosphate.

Also known in the art is a novel basic zinc phosphite composition and process for making the same, which composition imparts tannin stain inhibition and anticorrosive properties to coating compositions. This composition and process is disclosed in U.S. Pat. No. 3,917,804 which patent is owned by the assignee of the instant subject matter. This patent discloses a basic zinc phosphite having an emperical formula of $XZnO \cdot ZnHPO_3$ wherein X is a number from $\frac{1}{2}$ to 10. Although the performance of these materials is highly satisfactory, they suffer from the disadvantage of poor chemical stability, low gloss, poor dispersion and high oil absorption, rendering utility as an anticorrosive material less efficient. As a result industry has been constantly seeking a new substitute which exhibits high anticorrosive properties, chemical stability, high gloss, good dispersion and low oil absorption as an effective replacement material.

Figure 1:
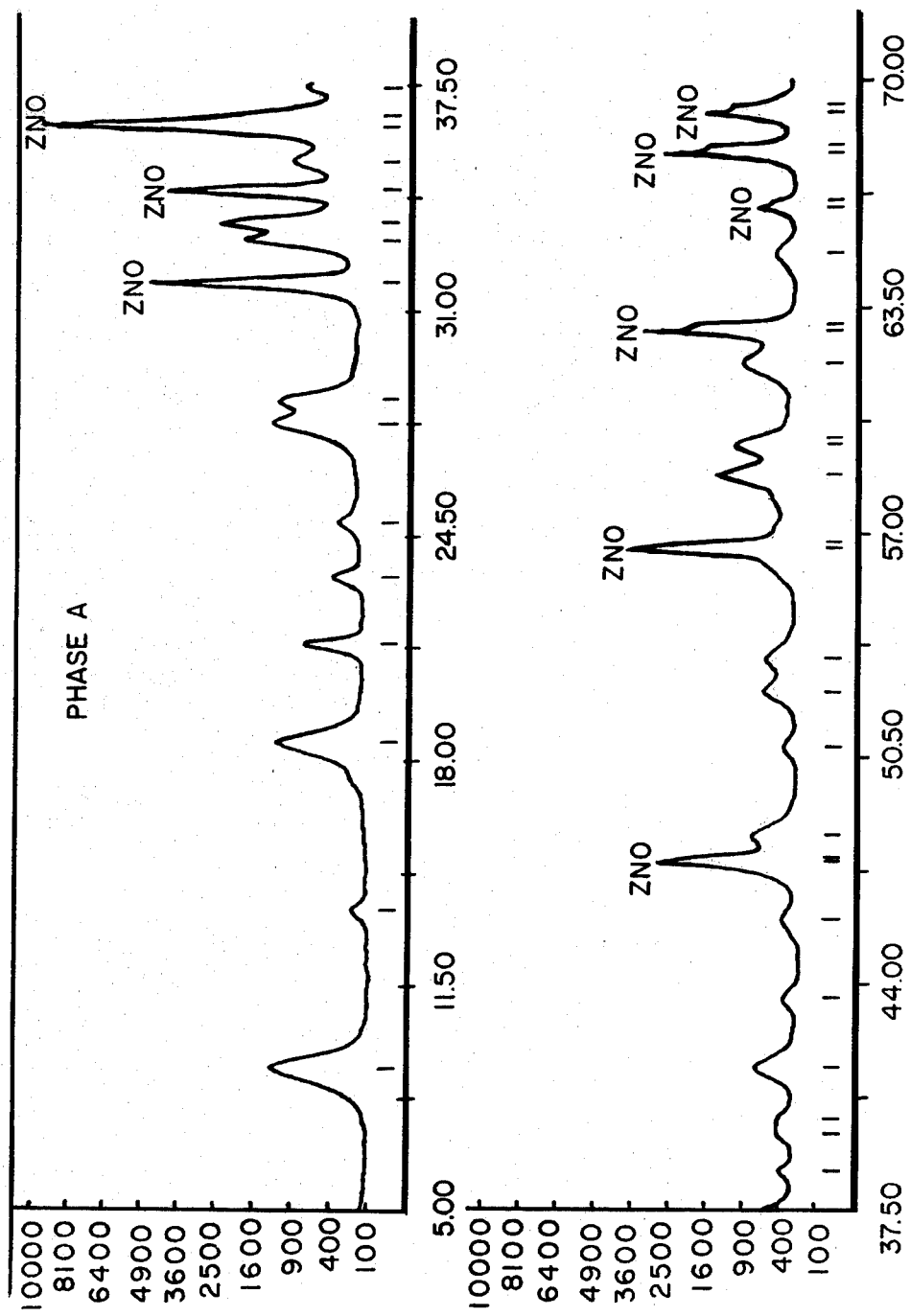
FIG. 1 shows an X-ray diffraction scan of a prior art composition having a theoretical structure of $[Zn(OH)_2 \cdot ZnHPO_3] \cdot 2ZnO$.

A novel composition of matter has been unexpectedly discovered which obviates the aforementioned prior art deficiencies. This novel composition of matter consists essentially of a zinc hydroxy phosphite complex represented by the theoretical structural formula $[2Zn(OH)_2 \cdot ZnHPO_3] \cdot XZnO$ wherein X is a number from 0 to 17 and wherein the structure has infrared absorption band frequencies at 3506; 3472; 3282; 3163; 2401; 2361; 1079; 947; 867; and 796 cm$^{-1}$, $\pm 4.0$ cm$^{-1}$, and X-ray diffraction d(A) spacings at 9.04; 5.94; 4.44; 3.58; 3.44; 3.38; 2.75; 2.70; and 1.67; $\pm 0.02$ A.

In the above formula there exists a molecular ratio of zinc ($Zn^{+2}$) values to phosphite ($HPO_3^{-2}$) values of 3 to 20:1, respectively, which corresponds to the formula depicted. This formula may be represented as containing bound water of hydration in lieu of the recited $[Zn(OH)_2]$ moiety. Such a representation may be depicted as $[2ZnO \cdot ZnHPO_3 \cdot 2H_2O] \cdot XZnO$ wherein X again is from 0 to 17. This latter formula, however, while empirically correct, does not appear to accurately represent the compositions of this invention as shown from the infrared absorption, X-ray defraction and thermal degradation data presented.

All of the instant complexes are white solids having slight solubilities in water and extremely low oil absorption. When these compositions were tested for pigmentary properties and anti-corrosive performance, the anti-corrosive performance matched or exceeded all prior art materials evaluated; however, pigmentary properties were greatly improved.

The compositions of the invention are novel in that they have been prepared and isolated by the inventors of record in a substantially pure state. As defined herein, the term substantially pure refers to the formation of a pure material within the limits of current infrared analytical techniques. Such techniques are accurate to purities up to 90%, that is, they are unable to detect impurities, such as different molecular species, below levels of 10% when present as equivalent empirical structures.

The compositions of this invention are differentiated from the compositions covered in U.S. Pat. No. 3,917,804 in several respects. First, they exhibit different pigmentary properties. Second, they have different chemical storage stabilities. Third, they exhibit different and distinct X-ray deffraction patterns, infrared absorption spectra and thermogravimetric decompositions. These latter differences are exemplified in FIGS. 1, 2, 3, and 4.

The compositions of U.S. Pat. No. 3,917,804 relate basically to zinc phosphites, which is for convenience referred to herein as a Phase A molecular structure. This molecular structure $[XZnO \cdot ZnHPO_3]$ may be represented by the structural formula $[Zn(OH)_2 \cdot ZnHPO_3] \cdot XZnO$ for purposes of comparison. This material is produced by the prior art as either a pure Phase A composition or as a mixture with other molecular species.

In contrast to the structure claimed by this patent, the instant composition may be depicted by the structural formula $[2Zn(OH)_2 \cdot ZnHPO_3] \cdot XZnO$ which is referred to herein as a Phase B molecular structure wherein X is a number from 0 to 17. Unlike the prior art composition this composition can only be prepared according to the novel process described herein in a substantially pure state. Mixtures of this material with other structures are not contemplated to be within the scope of the instant invention.

The process for preparing a substantially pure zinc hydroxy phosphite complex has been unexpectedly discovered which comprises the steps of (a) forming an aqueous slurry containing zinc oxide, phosphorous acid and a zinc hydroxy phosphite complex promoter;

(b) heating the slurry for a sufficient time to form a zinc hydroxy phosphite complex represented by the theoretical structural formula $[2Zn(OH)_2 \cdot ZnHPO_3] \cdot XZnO$ wherein X is a number from 0 to 17 and wherein the structure has infrared absorption band frequencies at 3506; 3472; 3282; 3163; 2401; 2361; 1079; 947; 867; and 796 cm$^{-1}$, $\pm 4.0$ cm$^{-1}$, and X-ray diffraction d(A) spacings at 9.04; 5.94; 4.44; 3.58; 3.44; 3.38; 2.75; 2.70; and 1.67, $\pm 0.02$ A;

(c) and recovering the zinc hydroxy phosphite complex.

In the process of preparing the instant compositions it is essential that a promoter be employed and that it be added to the reaction slurry prior to heating. If a promoter is not added or is added to a previously heated reaction slurry, the formation of a substantially pure Phase B structure is inhibited, and at best a Phase A material or Phase A mixtures will be prepared.

The reason for the occurrence of these different reaction sequences is not fully known. It is believed however that the reactants are behaving in a distinct manner. In particular, it is believed that the phosphorus acid, when hot, preferentially reacts with the promoter of this invention to form an intermediate structure, which structure then immediately reacts with free zinc oxide to form the Phase B structure. The sequence of these reactions, in the presence of excess water, may be shown as follows:

(1)
  (a) $H_3PO_3 + \text{promoter} + XZnO \rightarrow \text{Intermediate}$
  (b) $\text{Intermediate} + XZnO \rightarrow [2Zn(OH)_2 \cdot ZnHPO_3]$
(2)
  (a) $H_3PO_3 + ZnO \rightarrow ZnHPO_3$
  (b) $ZnHPO_3 + \text{promoter} + XZnO \rightarrow [2Zn(OH)_2 \cdot ZnHPO_3] \cdot XZnO$ wherein X is an indeterminate value.

In the absence of a promoter, the reaction sequences may be depicted as follows:

(3)
  (a) $H_3PO_3 + ZnO \rightarrow ZnHPO_3$
  (b) $ZnHPO_3 + ZnO \rightarrow [Zn(OH)_2 \cdot ZnHPO_3]$
(4) $ZnHPO_3 + ZnO \rightarrow [Zn(OH)_2 \cdot ZnHPO_3]$ Such a reaction, however, only produces the Phase A structure and not the Phase B structure.

The promoter material may be selected from any material which results in the formation of the novel, substantially pure Phase B material. Examples of useful materials include both the Phase A and Phase B crystal structure, notably $[Zn(OH)_2 \cdot ZnHPO_3] \cdot XZnO$ and
$[2Zn(OH)_2 \cdot ZnHPO_3] \cdot XZnO$
wherein X can be from 0 to 17.

The promoter must be employed in a sufficient amount to assure the immediate formation of the Phase B structure in a substantially pure state. The amounts necessary to form a substantially pure Phase B material have been found to be between 1.0% and 20% by weight of promoter based on the amount of ZnO reactant. Amounts less than 1.0% are not effective and result in the formation of mixtures containing the Phase B material.

The amount of water used to form the aqueous slurry with zinc oxide is not critical. Generally, acceptable handling efficiency is achieved when the total solids content by weight is between 5 and 50% and preferably around 25%. Higher amounts become too thick and difficult to stir whereas lesser amounts result in inefficient product yields.

Sufficient agitation should be used in forming the slurry in order to achieve a homogeneous dispersion of the zinc oxide. This is preferably accomplished by slowly adding the zinc oxide to water while constantly stirring the slurry until it appears that all the zinc oxide is evenly dispersed. If the zinc oxide is not well dispersed and agglomerates or aggregates of zinc oxide are present, incomplete reaction will take place resulting in low yields and low purities. The zinc oxide used must be substantially pure. Impure zinc oxides contaminated with other metallic oxides will result in reduced yields and reduced purities. Conventional chemical dispersion aids may also be employed accordingly to standard techniques to maintain the zinc oxide in a dispersed state. Representative dispersion aids may be selected from sodium salts of long chain carboxylic acids, sulfonates, lignosulfonates and polyphosphates.

The amount of zinc oxide added to the slurry must be sufficient to form the Phase B structure, notably at least three moles of zinc oxide for each mole of phosphorous acid employed. Amounts of zinc oxide above this level may be used since such amounts merely result in increasing the zinc oxide content of the Phase B structure. For example, the use of four moles of zinc oxide forms a structure having the formula $[2Zn(OH)_2 \cdot ZnHPO_3] \cdot ZnO$; 5 moles of zinc oxide form $[2Zn(OH)_2 \cdot ZnHPO_3] \cdot 2ZnO$; 6 moles of zinc oxide form $[2ZN(OH)_2 \cdot ZnHPO_3] \cdot 3ZnO$; and so forth.

The zinc oxide slurry must be prepared at a temperature below the reaction temperature. Preferred initial temperatures may range from 15° C. to 40° C. although temperatures outside this range may be useable. As indicated above, a critical aspect of the invention involves addition of the promoter to the reaction slurry prior to heating the reactant to the desired reaction temperature. The order of addition of the reactants is not critical except to the extent that the zinc oxide cannot be added after the acid and promoter are both present in the slurry. For example, acceptable methods include the use of zinc oxide and promoter being present prior to the acid addition, the acid being added either prior or subsequent to heating the reaction slurry.

The phosphorous acid used in the reaction can be any strength phosphorous acid, either anhydrous or in aqueous solution. It is preferred to use from 50% to 70% aqueous phosphorous acid since it is readily available and can be easily handled.

The phosphite values ($HPO_3^{-2}$) may be derived from a source other than phosphorus acid, such as from zinc phosphite ($ZnHPO_3$) directly or from its in situ preparation. The use of mixtures of phosphorous acid and zinc phosphite are contemplated to be within the scope of the invention.

The phosphorous acid should be added slowly to the zinc oxide, promoter, water slurry under constant agitation to prevent agglomeration of the reaction solids. Preferably this is accomplished by dropwise acid addition over a period of 10 to 60 minutes, most preferably 30 to 50 minutes.

After all the phosphorous acid has been added, the slurry is heated while stirring to accelerate the reaction. Generally heating is performed at temperatures from 45° to boiling and preferably 60° to 85° C. The process may be performed at higher temperatures under pressure. Once heated, the reaction is virtually complete immediately, with additional reaction times not being necessary. Even though not necessary, continued heating for times of 1 to 3 hours may be employed without detrimental effect upon crystal structure.

The zinc hydroxy phosphite complex produced may be recovered by convention liquid-solid recovery techniques.

As indicated above, the compositions of the invention are extremely useful in coating compositions broadly as an anticorrosive pigment. Valuable properties are typical oil absorption values of 14 to 22 which enables high loadings into coating systems resulting in increased anti-corrosive performance. These compositions also exhibit high gloss values, for example 48 at 60° angle in a semigloss white latex paint and 43 at 60° angle in a 1:1 oil/alkyd white primer. In addition, the compositions are chemically stable during storage, that is, no degradation or decomposition occurs and the compositions display excellent dispersion as evidenced by their fineness of grind values.

The present invention is further illustrated by the following examples. All parts and percentages in the examples as well as in the specifications and claims are by weight unless otherwise specified.

EXAMPLE 1

This Example shows the preparation of a preferred composition of the present invention.

A reaction vessel fitted with a mechanical stirrer is charged with 2000 g of water and 0.6 g TAMOL 731 (a trademark product available from Rohm and Haas Company) as a dispersant. To this homogeneous mixture is added 10 g of a promoter having the formula $[2Zn(OH)_2.ZnHPO_3].ZnO$ at room temperature. After stirring for a period of ten minutes to insure a uniform slurry, 200 g of zinc oxide is added at room temperature. The temperature is gradually raised from 22° C. to 85° C. over a thirty minute period. When the temperature of the reactor contents reaches 85° C., 71.6 g of 70.3% phosphorous acid is added dropwise over a period of 45 minutes while the contents of the reactor are maintained at 85° C. with continued stirring. After the completion of the addition of the phosphorous acid, the reaction slurry is analyzed. A 5 ml aliquot sample of the slurry is vacuum filtered and dried at 120° C. for 1 hour. Analysis of the dried sample by infrared spectroscopy indicates conversion to the inventive structure $[2Zn(OH)_2.ZnHPO_3].ZnO$ (Phase B structure). The reaction was continued for an additional 3 hours at 85° C.

Upon completion of the reaction, the solids are vacuum filtered and the product is then dried for 18 hours at 120° C. Analysis of the dried product by infrared spectroscopy indicates that complete conversion to the Phase B structure has occurred. No impurities, such as the Phase A structure are evident.

COMPARATIVE EXAMPLE A

This example demonstrates that Phase A, i.e. $[Zn(OH)_2.ZnHPO_3].2ZnO$ is prepared when a promoter is not present in the initial reaction charge.

The preparative procedure is the same as that described in Example 1 except that no promoter was added to the reaction vessel. Analysis of the final dried product by infrared spectroscopy indicates that only $[Zn(OH)_2.ZnHPO_3].2ZnO$ was prepared.

EXAMPLE 2

This Example demonstrates that Phase B can be prepared without the presence of unreacted ZnO in the final product.

The procedure described in Example 1 was repeated except that the amount of 70.3% phosphorous acid used was 95.5 g giving a $ZnO:H_3PO_3$ ratio of 3:1. Analysis of the final product by infrared spectroscopy and X-ray diffraction indicates the preparation of the Phase B structure, i.e. $[2Zn(OH)_2.ZnHPO_3]$ without ZnO. No Phase A structure was formed.

COMPARATIVE EXAMPLE B

This Example shows that Phase B without mixed ZnO is not prepared when a promoter is not added to the reactor. The procedure described in Example 2 is repeated except that no promoter was added in the reactor charge. Analysis of the final product by infrared spectroscopy indicates the preparation of only Phase A material, i.e. $[Zn(OH)_2.ZnHPO_3]ZnO$.

EXAMPLES 3-4

These Examples prepare Phase B material with differing amounts of zinc oxide by using different molar ratios of zinc oxide to phosphorous acid.

The method of preparation employed is the same as that of Example 1. Particular reactant parameters are presented in Table 1. 4.26 g of TAMOL 731 is used as the dispersant for ZnO in each example. The data demonstrate that excess ZnO does not modify the formation of the Phase B structure but merely alters the amount of ZnO added to the Phase B composition.

TABLE I

| Ex. No. | ZnO (g) | 70.3% H$_3$PO$_3$ (g) | H$_2$O (g) | Phase B (g) | Molar Ratio ZnO:H$_3$PO$_3$ | Product Composition |
|---|---|---|---|---|---|---|
| 3 | 710.7 | 71.6 | 3500 | 10 | 10:1 | [2Zn(OH)$_2$.ZnHPO$_3$].7ZnO |
| 4 | 710.7 | 35.8 | 3500 | 5 | 20:1 | [2Zn(OH)$_2$.ZnHPO$_3$].17ZnO |

EXAMPLE 5-11

COMPARATIVE EXAMPLES C AND D

These examples demonstrate the temperature range in which the inventive compositions can be prepared. The procedure of Example 1 was repeated except for the reaction temperatures. The temperature of reactor contents recited were maintained during and after the phosphorous acid addition. The different reaction temperatures and final products are presented in Table II. The data demonstrates that the Phase B structure $[2Zn(OH)_2.ZnHPO_3].ZnO$ can be prepared at varying reaction temperatures from 45° C. and above.

TABLE II

| Example No. | Reaction Temperature (°C.) | Infrared Identification |
|---|---|---|
| 5 | 90 | Phase B |
| 6 | 80 | Phase B |
| 7 | 70 | Phase B |
| 8 | 65 | Phase B |
| 9 | 60 | Phase B |
| 10 | 55 | Phase B |
| 11 | 45 | Phase B |
| C | 40 | Incomplete Reaction |
| D | 35 | Incomplete Reaction |

EXAMPLES 12-19

COMPARATIVE EXAMPLES E AND F

These Examples are presented to demonstrate the preparation of Phase B structures using different amounts of promoter material.

The preparative procedure employed is the same as that of Example 1 except the reaction temperature is 80° C. 0.6 g TAMOL 731 is used as a dispersant. Particular reactant parameters are summarized in Table III. Final dried products are analyzed by infrared spectroscopy.

The data demonstrate that when the promoter [2Zn(OH)$_2$.ZnHPO$_3$].ZnO is used in amounts equal to or larger than 1% (based by weight on the initial charge of ZnO) the formation of substantially pure Phase B structures [2Zn(OH)$_2$.ZnHPO$_3$].ZnO is achieved. The % promoter was based on the % weight to the initial charge of ZnO.

TABLE III

| Ex. No. | ZnO (g) | 70.3% H$_3$PO$_3$ (g) | H$_2$O (g) | Phase B (g) | Infrared Identification |
|---|---|---|---|---|---|
| E | 100 | 35.8 | 800 | 0.1 | Incomplete Reaction |
| F | 100 | 35.8 | 800 | 0.5 | Incomplete Reaction |
| 14 | 100 | 35.8 | 800 | 1.0 | Phase B |
| 15 | 100 | 35.8 | 800 | 2.0 | Phase B |
| 16 | 100 | 35.8 | 800 | 3.0 | Phase B |
| 17 | 100 | 35.8 | 800 | 4.0 | Phase B |
| 18 | 100 | 35.8 | 800 | 5.0 | Phase B |
| 19 | 100 | 35.8 | 800 | 20.0 | Phase B |

EXAMPLE 20

This Example is presented to show that the use of [2Zn(OH)$_2$.ZnHPO$_3$] which does not contain any mixed ZnO as the promoter can lead to the formation of Phase B with ZnO.

A reaction vessel fitted with a mechanical stirrer is charged with 800 g of water and 0.6 g of TAMOL 731 as a dispersant. To this homogenous mixture is added 5.0 g of [2Zn(OH)$_2$.ZnHPO$_3$] as promoter at room temperature. After stirring for a period of 10 minutes to insure a uniform slurry, 100 g of zinc oxide is added at room temperature. The slurry is allowed to mix for 30 minutes to achieve homogeneity and then the reactor temperature is gradually raised from 22° C. to 80° C. over a thirty minute period. When the temperature of the reactor contents reaches 80° C., 35.8 g of 70.3% phosphorous acid is added dropwise over a period of 45 minutes. The temperature of the reactor contents is maintained at 80° C. during the phosphorous acid addition. After the completion of the addition of the phosphorous acid, the reaction slurry is vacuum filtered and dried at 120° C. for 1 hour. Analysis of the dried sample by infrared spectroscopy indicates conversion to [2Zn(OH)$_2$.ZnHPO$_3$].ZnO. The reactor temperature is raised to 87° C. and maintained at 87° C. for three hours.

Upon completion of the reaction, the solids are vacuum filtered and the product is then dried for 18 hours at 120° C. Analysis of the dried product by infrared spectroscopy indicates complete conversion to [2Zn(OH)$_2$.ZnHPO$_3$].ZnO. No presence of Phase A is evident.

EXAMPLE 21

This Example is presented to demonstrate that [Zn(OH)$_2$.2ZnHPO$_3$].2ZnO (Phase A structure) can be used as a promoter in the formation of the novel Phase B structure. The method of preparation and amount of reactants employed is the same as that of Example 20 except that 5.0 g Phase A is employed as promoter in place of 5.0 g [2Zn(OH)$_2$.ZnHPO$_3$].ZnO. The final product is identified by infrared spectroscopy as [2Zn(OH)$_2$.ZnHPO$_3$].ZnO. No Phase A was identified.

EXAMPLE 22

This Example is presented to demonstrate that the Phase B structure can be prepared by reaction of ZnO (three molar equivalents) with ZnHPO$_3$ (one molar equivalent) in the presence of Phase B promoter.

A reaction vessel fitted with a mechanical stirrer is charged with 1250 g of water and 0.5 g TAMOL 731 as dispersant. To this homogeneous mixture is added 6.1 g of [2Zn(OH)$_2$.ZnHPO$_3$].ZnO as promoter at room temperature. After stirring for a period of ten minutes to achieve a uniform slurry, 122.1 g of zinc oxide is added at room temperature. The slurry is allowed to mix for 30 minutes to achieve a uniform slurry and then the reactor temperature is gradually raised from 22° C. to 85° C. over a thirty minute period. When the temperature of the reactor contents reaches 85° C., 72.7 g of zinc phosphite is added to the reactor. One hour after the addition of zinc phosphite, the reaction slurry is analyzed. A 5 ml aliquot sample of the slurry is vacuum filtered and dried at 120° C. for 1 hour. Analysis of the dried sample by infrared spectroscopy indicates conversion to [2Zn(OH)$_2$.ZnHPO$_3$].ZnO. The reaction was continued for an additional 2 hours at 85° C. and the final composition was a substantially pure [2Zn(OH)$_2$.ZnHPO$_3$].ZnO.

COMPARATIVE EXAMPLE G

Reaction between zinc oxide (three molar equivalents) and zinc phosphite without a promoter present leads to the preparation of a Phase A and not the novel Phase B structure. The preparative procedure is the same as that described in Example 22 except that no promoter was added to the reaction vessel. Analysis of the final dried product by infrared spectroscopy indicates the preparation of only Phase A [Zn(OH)$_2$.ZnHPO$_3$].2ZnO.

EXAMPLE 23

This Example is presented to show the low oil absorption values associated with the products presented in the invention.

[2Zn(OH)$_2$.ZnHPO$_3$]ZnO prepared according to Example 1 is passed through a Raymond mill fitted with an 0.020 inch screen. Oil absorption is measured according to ASTM standard method D281. In this procedure, refined white linseed oil having an acid value of from 1 to 3 is added drop by drop (by means of a pipet) to the pigment. The oil is incorporated uniformly into the pigment by mixing with a spatula. From the weight of the oil used to produce a putty-like paste and the weight of the pigment used, the number of pounds of oil required to wet 100 lbs. of pigment (the oil absorption value) is determined by the following equation:

$$A = [M \times 0.93)/P] \times 100$$

where:
A = oil absorption
M = milliliters of oil, and
P = grams of pigment

For novel [2Zn(OH)$_2$.ZnHPO$_3$].ZnO prepared according to Example 1, 0.41 ml of refined white linseed oil is required for 2.5 g of pigment. This leads to an oil absorption value of 15.3. For the prior art Phase A structure, i.e. [Zn(OH)$_2$.ZnHPO$_3$].ZnO prepared according to comparative Example A, 1.55 ml of refined white linseed oil is required for 2.5 g of pigment. This leads to an oil absorption value of 57.7. The lower oil absorption value of the novel Phase B structure is significant since this allows more material to be formulated into a given paint system at a higher loading level than the prior art material.

As such a greater quantity by weight of the novel Phase B material can be formulated into a given volume of vehicle. This results in the achievement of a superior anti-corrosive performance at higher loading which cannot be attained with the prior art Phase A compounds.

EXAMPLE 24

This Example is presented to illustrate three analytical methods: X-ray diffraction, infrared spectroscopy, and thermogravimetric analysis; by which [2Zn(OH)$_2$.ZnHPO$_3$].XZnO can be distinguished from the prior art [Zn(OH)$_2$.ZnHPO$_3$].ZnO.

Figure 2:
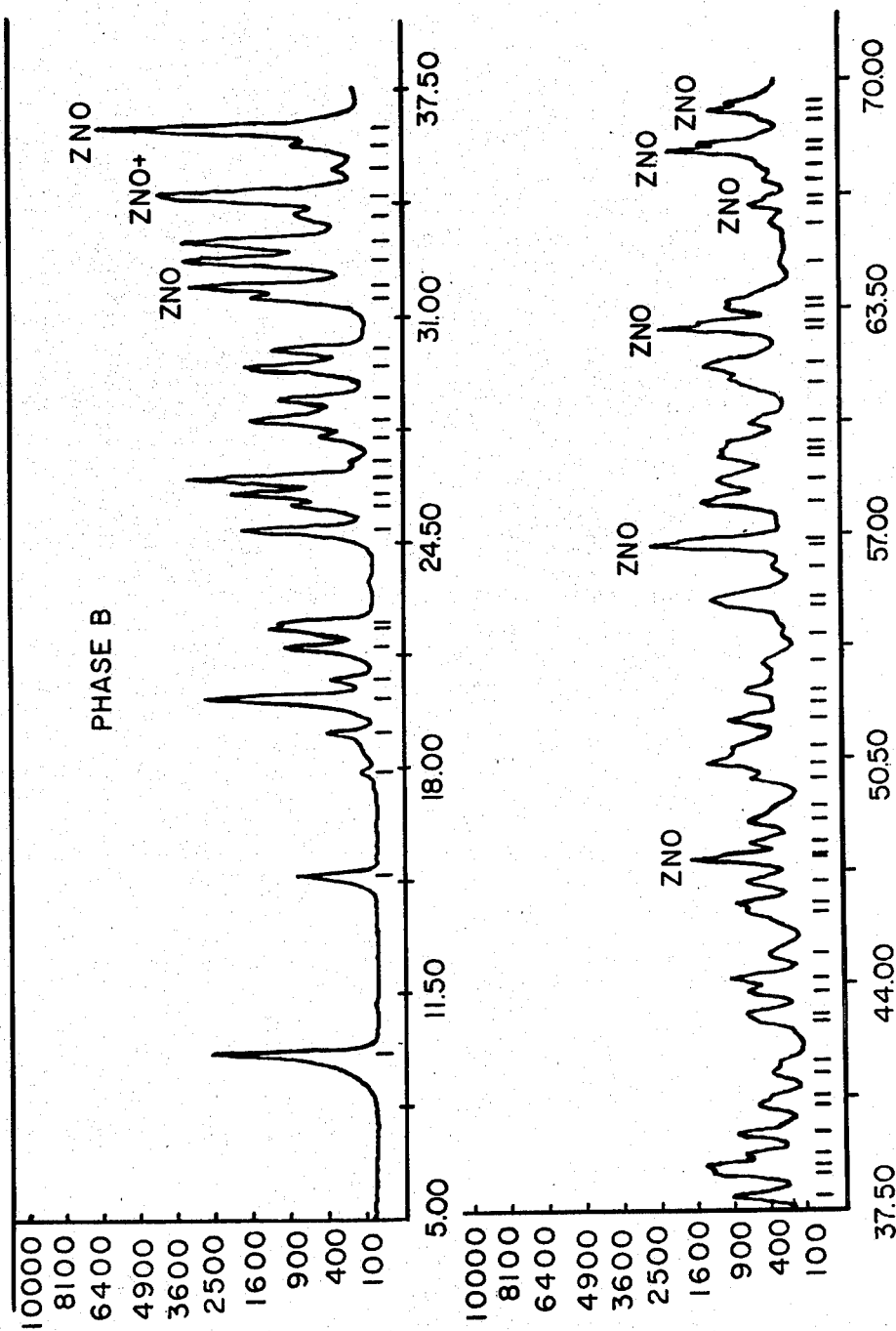
FIG. 2 shows an X-ray diffraction scan of a novel composition of the invention having a theoretical structure of $[2Zn(OH)_2 \cdot ZnHPO_3] \cdot ZnO$.

The novel Phase B structure contains 1 mole of ZnO and is prepared according to Example 1. The Phase A structure contains 2 moles of ZnO and is prepared according to comparative Example A. X-ray diffraction scans on both samples were recorded on a Phillips ADP 3600 as packed powders and is shown in FIGS. 1 and 2. Representative peaks are listed in Table IV. d(A) spaces are accurate to ±0.02 A. The X-ray diffraction scans allow differentiation between different crystalline structures and is commonly used for crystalline phase identification.

Figure 3:
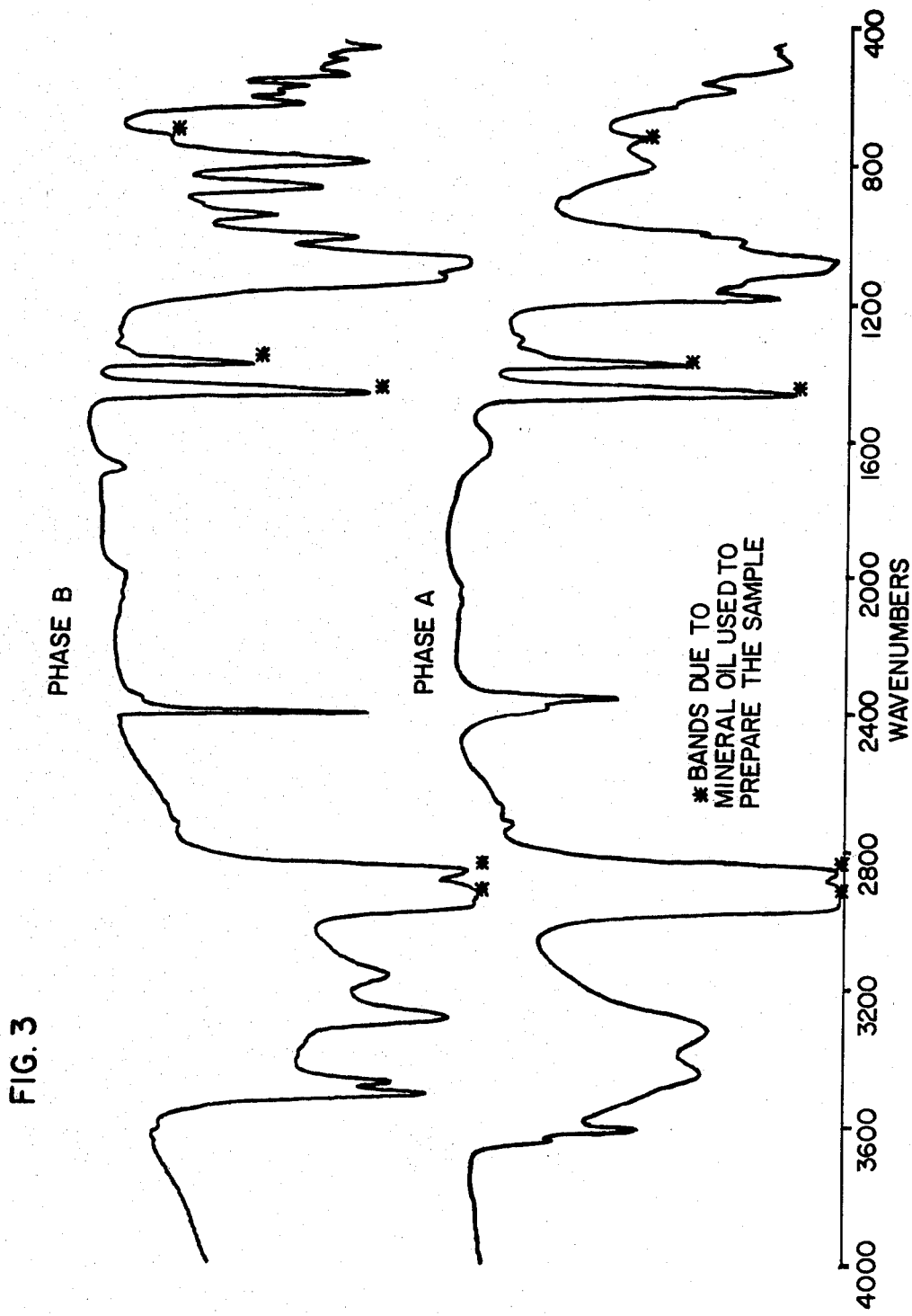
FIG. 3 shows infrared absorption spectra the compositions covered in FIGS. 1 and 2.

Infrared spectra were recorded on a Nicolet 7199 FT-IR spectrometer and shown in FIG. 3. A powdered sample was mulled with mineral oil and filmed on a KBr window. Frequencies are listed in Table V. Frequency values are accurate to ±4 cm$^{-1}$. Infrared spectroscopy leads to an easy method of distinguishing Phase B from Phase A. The infrared spectra illustrate the functional groups present in a composition and gives an indication of their local chemical environment.

Figure 4:
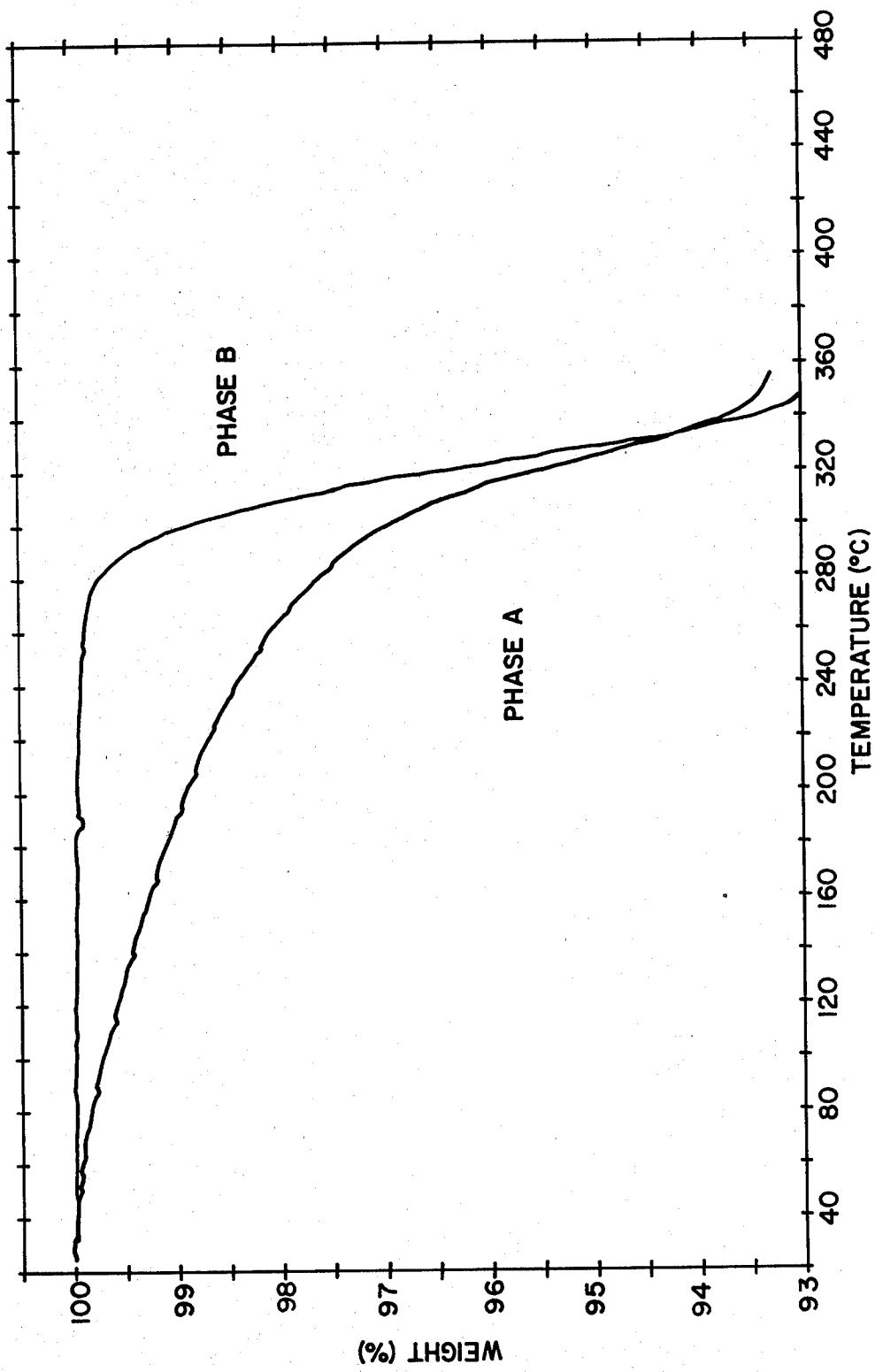
FIG. 4 shows thermogravimetric analysis curves of the compositions covered in FIGS. 1 and 2.

Prior to thermogravimetric analysis, samples prepared according to Example 1 and comparative Example A were dried at 105° C. for 16 hours. Thermogravimetric analysis curves are recorded on a DuPont 1090 analysis system and shown in FIG. 4. Samples were heated at 20° C. per minute in flowing nitrogen. Percent weight losses are recorded in Table VI. The thermogravimetric analysis shows the difference in thermal stability of a composition represented by loss of water. FIG. 4 shows the loss of water at lower temperatures for Phase A than for Phase B compositions.

As can be seen from the data, these three analytical methods are various tools by which Phase B is distinguished from Phase A.

TABLE IV

| X-Ray Diffraction Data* | |
|---|---|
| Phase A d(A°) | Phase B d(A°) |
| 9.68 | |
| | 9.04 |
| | 5.94 |
| 4.79 | |
| | 4.44 |
| 4.16 | |
| | 3.58 |
| | 3.44 |
| | 3.38 |
| 3.22 | |
| 3.14 | |
| | 2.75 |
| 2.71 | |
| | 2.70 |
| 2.68 | |
| | 1.67 |
| 1.57 | |
| 1.55 | |

*Intensities are not listed since preferred orientations can affect relative intensities.

TABLE V

| Infrared Spectra | | |
|---|---|---|
| Phase A Frequency (cm$^{-1}$) | Assignment | Phase B Frequency (cm$^{-1}$) |
| 3641 w | O—H stretch | 3506 s |
| 3607 m | | 3472 m |
| 3443 s | | 3282 s |
| 3318 s | | 3163 m |
| 2384 w | P—H stretch | 2401 s |
| 2357 m | | 2361 w |
| 1179 m | HPO$_3$ stretches and bends | 1079 s |
| 1081 s | | 947 w |
| 804 w | | 867 m |
| | | 796 m | w = weak intensity
m = medium intensity
s = strong intensity

TABLE VI

| Thermal Analysis Data | | |
|---|---|---|
| Temperature | % Weight Loss (Phase A) | % Weight Loss (Phase B) |
| 120° | 0.35 | <0.10 |
| 160° | 0.70 | <0.10 |
| 200° | 1.00 | <0.10 |
| 240° | 1.55 | <0.10 |
| 350° | 6.70 | 0.10 |

EXAMPLE 25

This example illustrates the excellent pigmentary properties and effective corrosion inhibiting properties of Phase B material, [2Zn(OH)$_2$.ZnHPO$_3$]ZnO, when used in a 1:1 oil/alkyd formulation.

Two 1:1 oil/alkyd maintenance primer formulations are prepared. Formulation 1 is prepared using the ingredients identified in Table VII which are mixed as indicated in the order in which they appear. The anti-corrosive pigment employed in this formulation is [2Zn(OH)$_2$.ZnHPO$_3$].ZnO, prepared in accordance with Example 1. [2Zn(OH)$_2$.ZnHPO$_3$].ZnO is added in sufficient quantity to comprise 13.2%, by weight, of the final formulation.

Formulation 2 is prepared in the same manner as formulation 1 except that the anti-corrosive pigment employed is [Zn(OH)$_2$.ZnHPO$_3$].2ZnO, prepared in accordance with comparative Example 1. [Zn(OH)$_2$.ZnHPO$_3$].2ZnO is added in sufficient quantity to comprise 13.2% by weight of the final formulation. Formulation 2 is provided for comparative purposes.

The properties of formulations 1 and 2 are tested in accordance with the procedures of the American Society for Testing and Materials (ASTM) according to the following procedures:

| Test | ASTM Method |
|---|---|
| Fineness of Grind | D1210-78 |
| 60° Gloss | D523-67 |
| Salt Fog Exposure | B117-73 |

-continued

| Test | ASTM Method |
|---|---|
| Rusting | D610-68 |
| Blistering | D716-56 |
| Stability | D1849-73* |

*cycle used in this test is 10 days at 140° F.

The test results obtained on formulation 1 and 2, using the aforementioned test methods, are listed in Table VIII.

As may be seen from the data in Table VIII, the pigment of the present invention is an effective anti-corrosive pigment in terms of rust prevention and blistering in the salt fog test and exhibits much superior paint properties in dispersion (fineness of grind) and gloss when compared to formulation 2 which employs Phase A, i.e. $[Zn(OH)_2.ZnHPO_3].2ZnO$, as the anti-corrosive pigment.

EXAMPLE 26

This example illustrates the excellent pigmentary properties and effective corrosion inhibiting properties of Phase B material having the structure $[2Zn(OH)_2.ZnHPO_3].ZnO$ when used in a latex coating formulation.

Two white latex paints for metal formulations are prepared. Formulation 3 is prepared using the ingredients identified in Table IX which are mixed as indicated in the order in which they appear. The anti-corrosive pigment used in this formulation is $[2Zn(OH)_2.ZnHPO_3].ZnO$ prepared in accordance with Example 1. $[2Zn(OH)_2.ZnHPO_3].ZnO$ is added in sufficient quantities to comprise 4.67%, by weight, of the final formulation.

Formulation 4 is prepared in the same manner as formulation 3 except that the anti-corrosive pigment employed is $[Zn(OH)_2.ZnHPO_3].2ZnO$, prepared in accordance with comparative Example 1. The $[Zn(OH)_2.ZnHPO_3].2ZnO$ content in the final formulation is 4.67% by weight of the final formulation. Formulation 4 is provided for comparative purposes.

The test results obtained on formulations 3 and 4, using the ASTM tests listed in Example 25, are listed in Table X.

As can be seen from the data in Table X, the present invention provides effective anti-corrosion protection and exhibits superior paint properties in terms of dispersion, gloss and heat stability when compared to formulation 4 which used Phase A, i.e. $[Zn(OH)_2.ZnHPO_3].2ZnO$, as the anti-corrosive pigment.

TABLE VII

1:1 OIL/ALKYD WHITE PRIMER

| INGREDIENT | GENERIC NAME | MANUFACTURER | FORMULATION 1 POUNDS | FORMULATION 2 POUNDS |
|---|---|---|---|---|
| | Add in the following order with mixing | | | |
| Aroplaz 1445 M-50 | Medium Oil Alkyd | Spencer Kellogg | 110 | 110 |
| AMSCO 66/3 | Mineral Spirits | Union Oil Co. | 136 | 136 |
| BENTONE 34 R/A | Organoclay | NL Industries, Inc. | 10 | 10 |
| | Mix for 5 minutes at 5000 rpm and add | | | |
| 95/5 MeOH/H₂O | Methanol/Water | | 3.3 | 3.3 |
| | Mix well for 5 minutes and add | | | |
| Nuosperse 700 | Mixed Phosphate Ester | Tenneco Chem. Co. | 5 | 5 |
| Raw Linseed Oil | Raw Linseed Oil | Spencer Kellogg | 105 | 105 |
| [Zn(OH)₂.ZnHPO₃].2ZnO | Phase A | NL Industries, Inc. | | 150 |
| [2Zn(OH)₂.ZnHPO₃].ZnO | Phase B | Pigment from Example 1 | 150 | |
| TITANOX 2101 Pigment | Titanium dioxide | NL Industries, Inc. | 200 | 200 |
| Nytal 400 | Magnesium Silicate Talc | R. T. Vanderbilt | 190 | 190 |
| | Disperse at 5500 rpm for 15 minutes | | | |
| | Letdown under moderate agitation | | | |
| Aroplaz 1445 M-50 | Medium Oil Alkyd | Spencer Kellogg | 176 | 176 |
| Raw Linseed Oil | Raw Linseed Oil | Spencer Kellogg | 39 | 39 |
| 6% Zr Nuxtra | Zirconium Driers | Tenneco Chem. Co. | 9.5 | 9.5 |
| 6% Mn Nuxtra | Manganese Driers | Tenneco Chem. Co. | 2.0 | 2.0 |
| Exkin No. 2 | Oxime | Tenneco Chem. Co. | 2.0 | 2.0 |
| | | TOTAL | 1137.8 | 1137.8 |

TABLE VIII

1:1 OIL/ALKYD WHITE PRIMER

| | FORMULATION NOS. | |
|---|---|---|
| | 1 | 2 |
| Paint Property | | |
| Fineness of Grind | 5.5 | 2.5 |
| 60° Gloss | 43 | 6 |
| Heat Stability | good | good |
| Salt Fog Exposure Results 500 Hours | | |
| Rusting | 9-10 | 9-10 |
| Blistering | 8 few | 8 few |

TABLE IX

WHITE LATEX PAINT FOR METAL

| INGREDIENT | GENERIC NAME | MANUFACTURER | FORMULATION 3 POUNDS | FORMULATION 4 POUNDS |
|---|---|---|---|---|
| | Add in the following order with mixing | | | |
| Water | | | 70 | 70 |
| Tamol 731 | Dispersing Agent | Rohm & Haas | 15 | 15 |
| Triton CF-10 | Alkyd Aryl Ester | Rohm & Haas | 3 | 3 |
| Nopco NDW | Antifoaming Agent | Diamond Shamrock | 2.5 | 2.5 |

TABLE IX-continued
WHITE LATEX PAINT FOR METAL

| INGREDIENT | GENERIC NAME | MANUFACTURER | FORMULATION 3 POUNDS | FORMULATION 4 POUNDS |
|---|---|---|---|---|
| Ethylene Glycol | Ethylene Glycol | | 23 | 23 |
| Propylene Glycol | Propylene Glycol | Ashland | 18 | 18 |
| Super Ad It | Di(Phenyl Mercury) dodecenyl succinate | Tenneco Chem Co. | 3 | 3 |
| Mix well then add | | | | |
| Cellosize QP4400 | Hydroxyethyl Cellulose | Hercules | 1 | 1 |
| [Zn(OH)$_3$.ZnHPO$_3$].2ZnO | Phase A | NL Industries, Inc. | | 50 |
| [2Zn(OH)$_2$.ZnHPO$_3$].ZnO | Phase B | Pigment from Example 1 | 50 | |
| TITANOX 2101 | Titanium Oxide | NL Industries, Inc. | 250 | 250 |
| Disperse at 5500 rpm for 20 minutes | | | | |
| Letdown under slow agitation after dispersion has cooled to 100° F. | | | | |
| Arolon 820W49 | Acrylic Polymer Emulsion | Spencer Kellogg | 634 | 634 |
| Nopco NDW | Antifoaming Agent | Diamond Shamrock | 2.5 | 2.5 |
| Texanol | Ester Alcohol | Eastman Chem. | 7 | 7 |
| 28% NH$_4$OH | Ammonium Hydroxide | | 1.2 | 1.2 |
| Water | | | 10 | 10 |
| | | TOTAL | 1090.2 | 1090.2 |

TABLE X
White Latex Paint for Metal

| Paint Property | FORMULATION NOS. 3 | FORMULATION NOS. 4 |
|---|---|---|
| Fineness of Grind | 5.5 | 3.0 |
| 60° Gloss | 48 | 36 |
| Heat Stability | good | poor |
| Salt Fog Exposure Results 500 Hours | | |
| Rusting | 8F | 8F |
| Blistering | 8 | 9 |

EXAMPLE 27

This example illustrates the excellent pigmentary properties and effective corrosion inhibiting properties of Phase B material having the structure [2Zn(OH)$_2$.ZnHPO$_3$].ZnO, when used in a chlorinated rubber paint coating formulation.

Two chlorinated rubber maintenance primer formulations are prepared. Formulation 5 is prepared using the ingredients identified in Table XI which are mixed as indicated in the order in which they appear. The anti-corrosive pigment employed in this formulation is [2Zn(OH)$_2$.ZnHPO$_3$].ZnO, prepared in accordance with Example 1. The [2Zn(OH)$_2$.ZnHPO$_3$].ZnO is added in sufficient quantity to comprise 16.8%, by weight, of the final formulation.

Formulation 6 is prepared in the same manner as formulation 5 except that the anti-corrosive pigment used is [Zn(OH)$_2$.ZnHPO$_3$].2ZnO. The [Zn(OH)$_2$.ZnHPO$_3$].2ZnO is added in sufficient quantity to comprise 16.8%, by weight, of the final formulation. Formulation 6 is provided for comparative purposes.

The properties of formulations 5 and 6, using the ASTM test methods listed in Example 25, are listed in Table XII.

TABLE XI
CHLORINATED RUBBER PRIMER

| INGREDIENT | GENERIC NAME | MANUFACTURER | FORMULATION 5 POUNDS | FORMULATION 6 POUNDS |
|---|---|---|---|---|
| | Add in the following order with mixing | | | |
| | Prepare Chlorinated Rubber Solution separately as follows: | | | |
| | Mix at high speed until solution is complete | | | |
| Xylene | Xylene | Ashland Chemicals | 453 | 453 |
| Alloprene | Chlorinated Rubber | Imperial Chemical Industries (ICI) | 180 | 180 |
| | Add in order shown with mixing | | | |
| Chlorinated Rubber Solution | | | 330 | 330 |
| Cereclor 70L | Chlorinated Paraffin | ICI | 30 | 30 |
| Cereclor 42P | Chlorinated Paraffin | ICI | 60 | 60 |
| Nuoperse 700 | Mixed Phosphate Ester | Tenneco Chem. Co. | 8 | 8 |
| BENTONE 34 R/A | Organoclay | NL Industries, Inc. | 4 | 4 |
| THIXATROL ST R/A | Hydrogenated Castor Oil | NL Industries, Inc. | 3 | 3 |
| | Mix at high speed for 5 minutes | | | |
| [Zn(OH)$_2$.ZnHPO$_3$].2ZnO | Phase A | NL Industries, Inc. | | 200 |
| [2Zn(OH)$_2$.ZnHPO$_3$].ZnO | Phase B | Pigment from Example 1 | 200 | |
| Nytal 300 | Magnesium Silicate Talc | R. T. Vanderbilt | 20 | 20 |
| Red Iron Oxide 1503 | Red Iron Oxide | Reichard Coulston | 60 | 60 |
| Barytes | Barium Sulfate | Pfizer | 100 | 100 |
| 325 W.G. Mica | Mica | English Mica | 40 | 40 |
| | Disperse at high speed, maintain 110° F.–125° F. | | | |

TABLE XI-continued

CHLORINATED RUBBER PRIMER

| | | | FORMULATION | |
|---|---|---|---|---|
| INGREDIENT | GENERIC NAME | MANUFACTURER | 5 POUNDS | 6 POUNDS |
| | Then add at low speed | | | |
| Aroplaz 1271 | Long Oil Alkyd | Spencer Kellogg | 30 | 30 |
| 6% Zr Nuxtra | Zirconium Driers | Tenneco Chem. Co. | 2 | 2 |
| 6% Co Nuxtra | Cobalt Driers | Tenneco Chem. Co. | 0.5 | 0.5 |
| Chlorinated Rubber Solution | | | 303 | 303 |
| Propylene Oxide | Propylene Oxide | Union Carbide Corp. | 1.0 | 1.0 |
| | | TOTAL | 1191.5 | 1191.5 |

TABLE XII

Chlorinated Rubber Maintenance Primer

| | FORMULATION NOS. | |
|---|---|---|
| Paint Property | 5 | 6 |
| Fineness of Grind | 3.0 | 3.0 |
| 60° Gloss | 8.6 | 1.9 |
| Heat Stability | good | good |
| Salt Fog Exposure Results 500 Hours | | |
| Rusting | 10 | 9 |
| Blistering | 10 | 8M |

EXAMPLE 28

The following Example is presented to demonstrate that Phase B structure, because of low oil absorption can be incorporated into paint systems at high loads to achieve excellent anti-corrosive performance.

A 1:1 oil/alkyd maintenance primer is prepared using the ingredients identified in Table XII which are mixed as indicated in the order in which they appear. The anti-corrosive pigment employed in this formulation is $[2Zn(OH)_2 \cdot ZnHPO_3] \cdot 2ZnO$ prepared in accordance with Example 1. The $[2Zn(OH)_2 \cdot ZnHPO_3] \cdot 2ZnO$ is added in sufficient quantity to comprise 34.9%, by weight, of the final formulation.

The anti-corrosive performance of this formulation is tested in accordance with the procedures established by ASTM Method B117-73. By the ASTM test methods listed in Example 25, a rust rating of 10 and a blistering rating of 10 is observed after 1000 hours exposure.

Attempts to incorporate Phase A structure, having the structure $[Zn(OH)_2 \cdot ZnHPO_3] \cdot 2ZnO$ at loadings as high as 40 lb/100 gal failed because of the high oil absorption associated with this material.

As may be seen from the data, the pigment of the present invention is an effective anti-corrosive pigment in terms of rust prevention and blistering in the salt fog test at high loadings. These loadings cannot be achieved with the prior art material.

TABLE XIII

1:1 OIL/ALKYD RED PRIMER FORMULATION

| INGREDIENT | GENERIC NAME | MANUFACTURER | POUNDS | GALLONS |
|---|---|---|---|---|
| | Add in the following order with mixing | | | |
| Aroplaz 1445-M-50 | Medium Oil Alkyd | Spencer Kellogg | 67.5 | 9.00 |
| M.S. Rule 66 | Mineral Spirits | Union Oil | 118.88 | 18.87 |
| BENTONE 34 R/A | Organoclay | NL Industries, Inc. | 4.35 | 0.30 |
| | Mix for 5 minutes at 5000 rpm and add | | | |
| 95/5 MeOH/H₂O | Methanol/Water | | 1.31 | 0.20 |
| | Mix for 5 minutes and add | | | |
| Ray Linseed Oil | Raw Linseed Oil | Spencer Kellogg | 92.40 | 12.00 |
| | Mix for 5 minutes and add | | | |
| $[2Zn(OH)_2 \cdot ZnHPO_3] \cdot ZnO$ | Phase B | Pigment from Example 1 | 401.34 | 12.27 |
| Red Iron Oxide | Red Iron Oxide | Reichhold/Colston | 135.00 | 3.63 |
| | Disperse at 5500 rpm to 3.5 N.S. (Hegman Grind) | | | |
| Aroplaz 1445-M-50 | Medium Oil Alkyd | Spencer Kellogg | 252.15 | 33.62 |
| Raw Linseed Oil | Raw Linseed Oil | Spencer Kellogg | 67.38 | 8.75 |
| 6% Zr Nuxtra | Zirconium Driers | Tenneco Chem. Co. | 6.79 | 0.96 |
| 6% MN Nuxtra | Manganese Driers | Tenneco Chem. Co. | 1.83 | 0.22 |
| Exkin No. 2 | Oxime | Tenneco Chem. Co. | 1.39 | 0.18 |
| | | TOTAL | 1150.32 | 100.00 |

The invention being thus described, it will be obvious that the same may be varied in many ways. Such variations are not to be regarded as a departure from the spirit and scope of the invention and all such modifications are intended to be included within the scope of the following claims.

We claim:

1. A substantially pure composition of matter consisting essentially of a zinc hydroxy phosphite complex represented by the theoretical structural formula $[2Zn(OH)_2 \cdot ZnHPO_3] \cdot XZnO$ wherein X is a number from 0 to 17 and wherein the structure has infrared absorption frequencies at 3506; 3472; 3282; 3163; 2401; 2361, 1079; 947; 867; and 796 cm$^{-1}$, ±4.0 cm$^{-1}$, and X-ray diffraction d(A) spacings at 9.04; 5.94; 4.44; 3.58; 3.44; 3.38; 2.75; 2.70; and 1.67; ±0.02 A.

2. The composition of claim 1 consisting essentially of $[2Zn(OH)_2 \cdot ZnHPO_3]$.

3. The composition of claim 1 consisting essentially of $[2Zn(OH)_2 \cdot ZnHPO_3] \cdot ZnO$.

4. The composition of claim 1 consisting essentially of $[2Zn(OH)_2 \cdot ZnHPO_3] \cdot 2ZnO$.

5. A process for preparing a zinc hydroxy phosphite complex, which comprises:

(a) forming an aqueous slurry containing zinc oxide, phosphorous acid and a zinc hydroxy phosphite complex promoter;

(b) heating the slurry for a sufficient time to form a zinc hydroxy phosphite complex represented by the theoretical structural formula [2Zn(OH)$_2$.ZnHPO$_3$].XZnO wherein X is a number from 0 to 17 and wherein the structure has infrared absorption frequencies at 3506; 3472; 3282; 3163; 2401; 2361; 1079; 947; 867; and 796 cm$^{-1}$, ±4.0 cm$^{-1}$, and X-ray diffraction d(A) spacings at 9.04; 5.94; 4.44; 3.58; 3.44; 3.38; 2.75; 2.70; and 1.67; ±0.02 A;

(c) and recovering the zinc hydroxy phosphite complex.

6. The process of claim 5 wherein the zinc hydroxy phosphite complex promoter is selected from the group consisting of [Zn(OH)$_2$.ZnHPO$_3$].XZnO, [2Zn(OH)$_2$.ZnHPO$_3$].XZnO and mixtures thereof wherein X is a number from 0 to 17.

7. The process of claim 6 wherein the zinc hydroxy phosphite complex promoter is used in amounts of 1 to 20% by weight of zinc oxide reactant.

8. The process of claim 5 wherein the zinc hydroxy phosphite complex promoter is added to the aqueous slurry prior to heating the slurry.

9. The process of claim 5 wherein the total solids content of the aqueous slurry is between 5 and 50% by weight.

10. The process of claim 5 wherein the slurry is heated to a temperature from 45° C. to the boiling point to form the zinc hydroxy phosphite complex.

11. The process of claim 5 wherein the zinc oxide and promoter are used to make the aqueous slurry, and then the phosphorous acid is added after heating the slurry in step (b).

12. The process of claim 5 wherein zinc phosphite is used instead of phosphorous acid and zinc oxide.

13. The process of claim 5 wherein zinc phosphite is used in combination with phosphorous acid.

14. A process of preparing a zinc hydroxy phosphite complex, which comprises:

(a) forming an aqueous slurry containing zinc oxide and a zinc hydroxy phosphite complex promoter selected from the group consisting of [Zn(OH)$_2$.ZnHPO$_3$].2ZnO; [2Zn(OH)$_2$.ZnHPO$_3$].XZnO and mixtures thereof wherein X is a number from 0 to 17;

(b) heating the slurry to a temperature from 45° C. to the boiling point;

(c) adding a material selected from the group consisting of phosphorous acid, zinc phosphite and mixtures thereof; and (d) preparing a material represented by the theoretical structural formula [2Zn(OH)$_2$.ZnHPO$_3$].XZnO wherein X is a number from 0 to 17 and wherein the structure has infrared absorption frequencies at 3506; 3472; 3282; 3163; 2401; 2361; 1079; 947; 867; and 796 cm$^{-1}$, ±4.0 cm$^{-1}$, and X-ray diffraction d(A) spacings at 9.04; 5.94; 4.44; 3.58; 3.44; 3.38; 2.75; 2.70; and 1.67±0.02 (A).

* * * * *